United States Patent
Yates et al.

(10) Patent No.: US 9,551,513 B2
(45) Date of Patent: Jan. 24, 2017

(54) FREQUENCY-MATCHED CRYOCOOLER SCALING FOR LOW-COST, MINIMAL DISTURBANCE SPACE COOLING

(71) Applicant: Raytheon Company, Waltham, MA (US)

(72) Inventors: Ryan Yates, Los Angeles, CA (US); Theodore J. Conrad, Redondo Beach, CA (US); Andrew L. Bullard, Manhattan Beach, CA (US)

(73) Assignee: RAYTHEON COMPANY, Waltham, MA (US)

( * ) Notice: Subject to any disclaimer, the term of this patent is extended or adjusted under 35 U.S.C. 154(b) by 217 days.

(21) Appl. No.: 14/303,036

(22) Filed: Jun. 12, 2014

(65) Prior Publication Data

US 2015/0362221 A1 Dec. 17, 2015

(51) Int. Cl.
*F25B 9/00* (2006.01)
*F25B 9/14* (2006.01)
*G01C 19/02* (2006.01)

(52) U.S. Cl.
CPC .............. *F25B 9/14* (2013.01); *F25B 9/145* (2013.01); *F25B 2309/001* (2013.01); *F25B 2309/1411* (2013.01); *F25B 2309/1423* (2013.01); *F25B 2400/073* (2013.01); *F25B 2500/13* (2013.01); *G01C 19/02* (2013.01)

(58) Field of Classification Search
CPC .................................... F25B 9/14; F25B 9/145
USPC ............................... 62/6, 159, 193, 226, 508
See application file for complete search history.

(56) References Cited

U.S. PATENT DOCUMENTS

| | | | |
|---|---|---|---|
| 5,836,165 A | 11/1998 | Champion et al. | |
| 7,062,922 B1 | 6/2006 | Kirkconnell et al. | |
| 2004/0000149 A1* | 1/2004 | Kirkconnell | F25B 9/145 62/6 |
| 2004/0168445 A1* | 9/2004 | Kunitani | F25B 9/14 62/6 |
| 2005/0210886 A1 | 9/2005 | Lynch | |
| 2014/0069115 A1 | 3/2014 | Bellis et al. | |

OTHER PUBLICATIONS

International Search Report from the International Searching Authority, dated Jul. 28, 2015, in connection with U.S. Application No. PCT/US2015/025928, 4 pages.
Written Opinion of the International Searching Authority, dated Jul. 28, 2015, in in connection with U.S. Application No. PCT/US2015/025928, 5 pages.

\* cited by examiner

*Primary Examiner* — Melvin Jones

(57) ABSTRACT

Components within a cryocooler are scaled and/or configured for operation at a CMG operating frequency (e.g., 100 Hz) rather than at 30 to 70 Hz, matching the exported disturbances of control moment gyroscopes on the same platform and reducing line-of-sight jitter for electro-optic infrared focal plane array sensors. The smaller piston working volume and other reduced component sizes allow the cryocooler to be smaller and lighter than designs operating at lower frequencies. Combined with an advanced regenerator suitable for the higher frequency operation, the cryocooler has improved cooling efficiency over such lower frequency designs.

20 Claims, 5 Drawing Sheets

FREQUENCY-MATCHED CRYOCOOLER SCALING FOR LOW-COST, MINIMAL DISTURBANCE SPACE COOLING

TECHNICAL FIELD

The present disclosure is directed in general to cryogenic coolers, and more particularly, to a low cost cryogenic cooler for space-borne systems that cannot tolerate vibration disturbance and/or either cannot use or do not warrant the cost and complexity of using a cryoradiator.

BACKGROUND OF THE DISCLOSURE

Spacecraft, particularly those with or electro-optic/infrared (EO/IR) sensor systems, typically include various types of sensors for capturing images, computers for processing information, and communication modules for transmitting data to and receiving data from external systems. Thus, such spacecraft often include a pulse tube expander or Stirling cycle cryogenic cooler to remove heat from the sensors and/or to cool the sensors to very low temperatures (for example 65 Kelvin). Cryogenic coolers generally include several moving components, such as a compressor piston, a motorized driver for that compressor piston, a expander piston (also referred to as a displacer piston), a motorized driver for that displacer piston, balancer pistons, and motorized drivers for each of the balancer pistons. These moving components can generate vibrations.

Space-borne EO/IR systems frequently cannot tolerate vibration disturbances, and in some such applications may not warrant the cost and/or complexity of a cryoradiator. In particular, most (if not all) sensitive space EO/IR systems use control moment gyroscopes (CMGs, or "gyrodynes") for inertial control of the vehicle. The CMGs spin at, for example, 100 Hertz (Hz), requiring all structures to be designed to not resonate at 100 Hz in order to avoid line-of-sight jitter. Any cryocooler operating within such a spacecraft may be permitted to have greater exported disturbances than if operating at any frequency other than 100 HZ, with higher frequencies also improving disturbance roll-off associated with vibration isolators and eliminating the need for launch locks. However, most existing pulse tube expander and Stirling cycle space cryocoolers suitable for IR focal plane array (FPA) cooling operate at frequencies between 30 and 70 Hz (often the worst frequencies for exported disturbance), causing vibration of sensitive optical systems.

There is, therefore, a need in the art for a low cost cryocooler designed to be compatible with existing CMG operating frequencies.

SUMMARY OF THE DISCLOSURE

Components within a cryocooler are scaled and/or configured for operation at a CMG operating frequency (e.g., 100 Hz) rather than at 30 to 70 Hz, matching the exported disturbances of control moment gyroscopes on the same platform and reducing line-of-sight jitter for electro-optic infrared focal plane array sensors. The smaller piston working volume and other reduced component sizes allow the cryocooler to be smaller and lighter than designs operating at lower frequencies. Combined with an advanced regenerator suitable for the higher frequency operation, the cryocooler has improved cooling efficiency over such lower frequency designs.

Although specific advantages have been enumerated above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
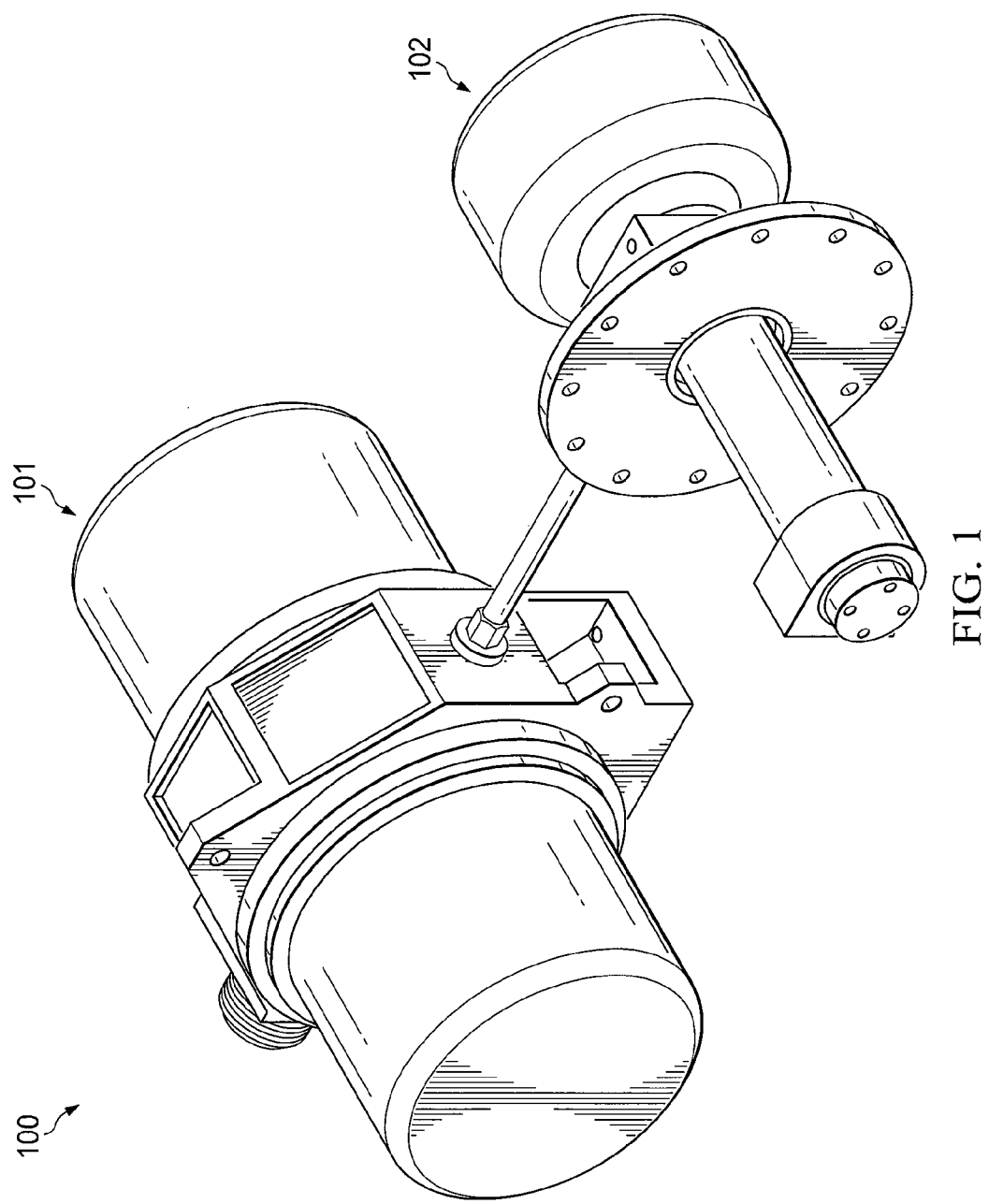
FIGS. 1 and 1A-1C are various views of components of a cryocooler scaled for operation at the CMG operating frequency in accordance with embodiments of the present disclosure.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Additionally, unless otherwise specifically noted, articles depicted in the drawings are not necessarily drawn to scale.

Available space cryocoolers for applications needing low exported vibration are very expensive and generally have long manufacturing lead times. Typically the need for low exported vibration is met through the use of expensive, complicated isolation platforms, costly position feedback systems and associated electronics, and/or low quality tactical grade components.

FIGS. 1 and 1A-1C are various views of components of a cryocooler scaled for operation at the CMG operating frequency in accordance with embodiments of the present disclosure. Many CMGs operate at 100 Hz, but some operate at 110 Hz or 120 Hz, or even at other frequencies. In the description below, "100 Hz" is intended to be merely representative of a CMG operating frequency, and those skilled in the relevant art will understand that matching of the appropriate CMG operating frequency is intended. The frequency matching may be achieved through suitable design of drive electronics or selection of the number of flexures, as discussed below.

Figure 1A:
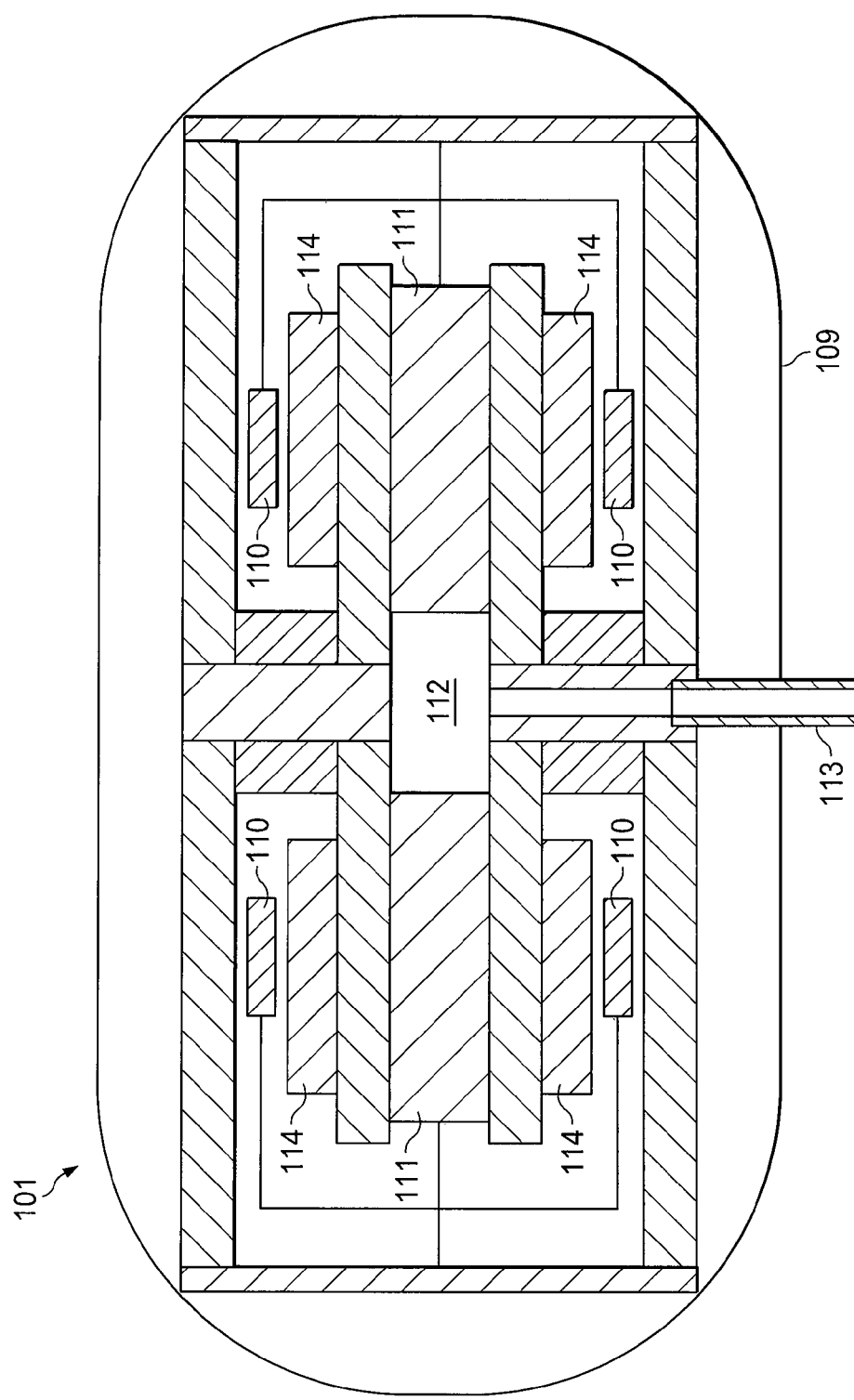
Figure 1B:
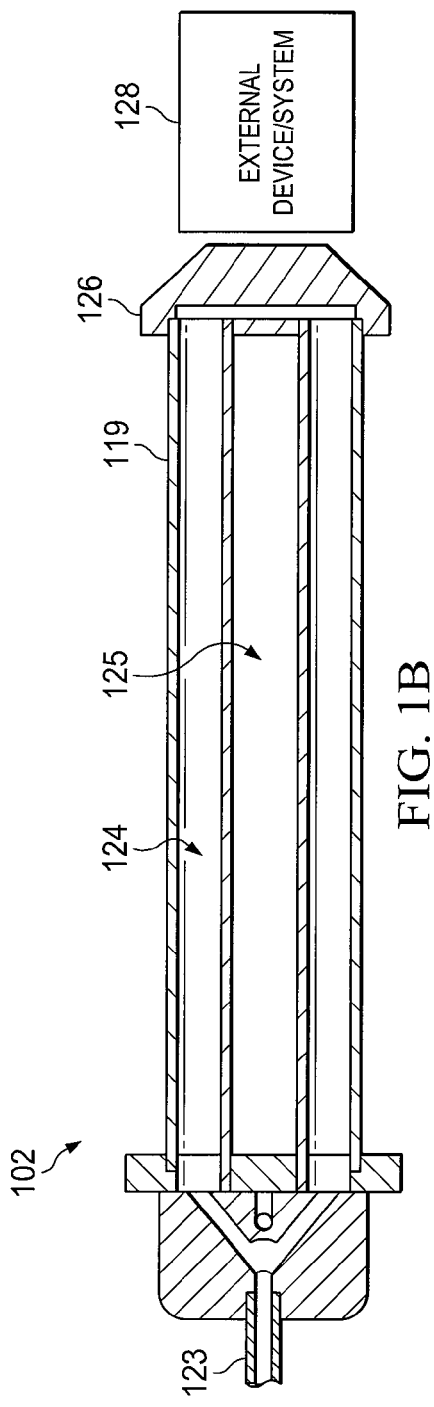
Figure 1C:
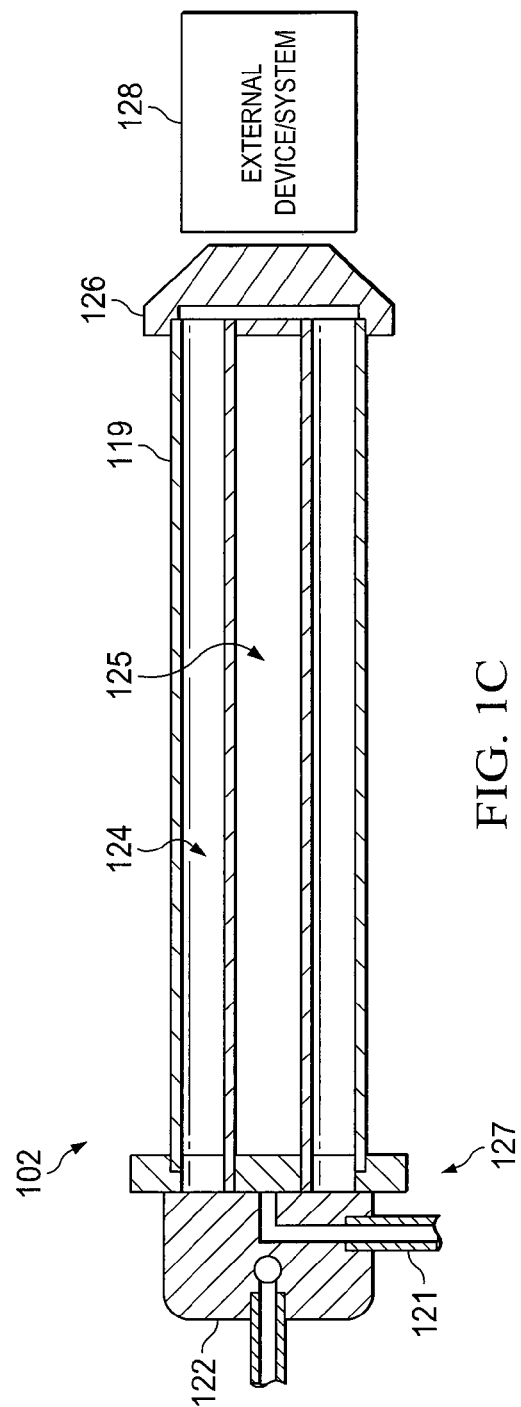

FIG. 1 is a perspective view of a voice coil powered, dual-opposed piston compressor 101 and a pulse tube expander 102 used within a 100 Hz cryocooler 100 in accordance with embodiments of the present disclosure. FIG. 1A is a sectional view of the compressor 101 of FIG. 1 illustrating internal components somewhat diagrammatically. Inside the compressor housing 109 are disposed two linear voice coil motors (or actuators) 110 powering two axially aligned piston assemblies 111 forming a balanced compressor for inherently low exported force levels and held in place at least partially by stacks of high axial stiffness flexures 114, a center housing 112 and a transfer line adapter 113. FIGS. 1B and 1C are a top sectional view and a side sectional view, respectively, of the pulse tube expander 102 of FIG. 1. The pulse tube expander housing 119 is coupled to a surge volume by an inertance tube 121 and includes a (warm manifold) heat reject 122, a (transfer line) vacuum interface 123, and a Dewar interface 127 at one end. Inside the pulse tube expander housing 119 is an advanced regenerator 124 and a pulse tube 125. A cold tip 126 forms one end of the pulse tube expander housing 119.

In operation of the cryocooler 100, the pistons stroke back and forth during each compression cycle, and multiple compression cycles occur at a specified drive or operating frequency. The compressor 101 includes a structure suitable for compressing at least one gas or other fluid(s) used in a cooling system, while the piston assemblies 111 each include suitable structure configured to repeatedly move the pistons back and forth in order to compress the at least one gas or fluid during multiple compression cycles, including specifically the flexures 114.

The cold tip 126 is in fluid communication with the compressor 101, so that as the pistons move, fluid is alternately pushed into the cold tip 126, increasing the pressure within the cold tip 126, and allowed to exit the cold tip 126, decreasing the pressure within the cold tip 126. This back and forth motion of the fluid, along with controlled expansion and contraction of the fluid as a result of the changing pressure, creates cooling in the cold tip 126. The cold tip 126 can therefore, for example, be thermally coupled to a device or system to be cooled.

The cryocooler 100 also includes a pulse tube 125 and a regenerator 124. The regenerator 124 represents a structure that contacts the fluid and exchanges heat with the fluid. For example, when the fluid passes to the cold tip 126, heat from the fluid is absorbed by the regenerator 124 during half of the thermodynamic cycle. When the fluid passes away from the cold tip 126, heat from the regenerator 124 is absorbed by the fluid during the other half of the thermodynamic cycle.

The cold tip 126 includes any structure suitable for coupling to an external device or system 128 to be cooled. The pulse tube 125 represents any suitable structure through which fluid can flow, and the regenerator 124 includes any suitable structure for transferring heat to and from fluid. The regenerator 124 is commonly, for example, a porous structure (such as a matrix of porous material or a metallic mesh). The pulse tube 125 is fluidly coupled to a surge volume 120, typically sealed against the ambient environment to prevent venting of the fluid, and the inertance tube 121 defines a path through which the fluid in the pulse tube 125 can flow to reach the surge volume 120, such as small tubing of metal or other material. The entire structure could be formed from any suitable material(s), have any size, shape, and dimensions suitable for operation at 100 Hz, and be fabricated in any suitable manner.

Those skilled in the relevant art will recognize that the full structure and operation of a compressor and pulse tube expander for a cryocooler is not described herein. Instead, for simplicity and clarity, only so much of the known structure and operation for a cryocooler compressor and pulse tube expander as is unique to the present disclosure or necessary for an understanding of the present disclosure is depicted in the figures and/or explicitly described.

The compressor 101 and pulse tube expander 102 depicted in FIGS. 1 and 1A-1B are scaled (the requisite scaling is within the skill of those in the art) for operation at 100 Hz, which is the baseline operating frequency of CMGs used on space platforms and therefore a typical stay-out zone for structural resonances. However, in contravention to existing thinking and practice within the art, under which cryocoolers operate at 30 to 70 Hz (e.g., at 60 Hz), having the cryocooler operate in same frequency regime as the CMGs has been determined to be opportune. Structural modelling shows that a reduction in size and mass of up to 20% or more may be achieved, with thermodynamic modelling predict a cooling performance improvement of two times the benchmark and electromagnetic modelling used to scale the motors predicting similar performance to alternative designs at smaller size/mass.

Regenerator performance (efficiency), which depends on thermal contact between a solid and gas, could suffer as the operating frequency is increased from 30 to 70 Hz up to 100 Hz. As discussed above, the regenerator 124 is normally a porous material. Recently developed advanced regenerators (see, e.g., U.S. Patent Application Publication No. 2012/0067556), however, have a controllable pore size and low pressure drop, with analysis indicating suitability for high frequency operation. As used herein, "advanced regenerator" refers to a regenerator of the type described in the above-identified patent application publication.

Figure 2A:
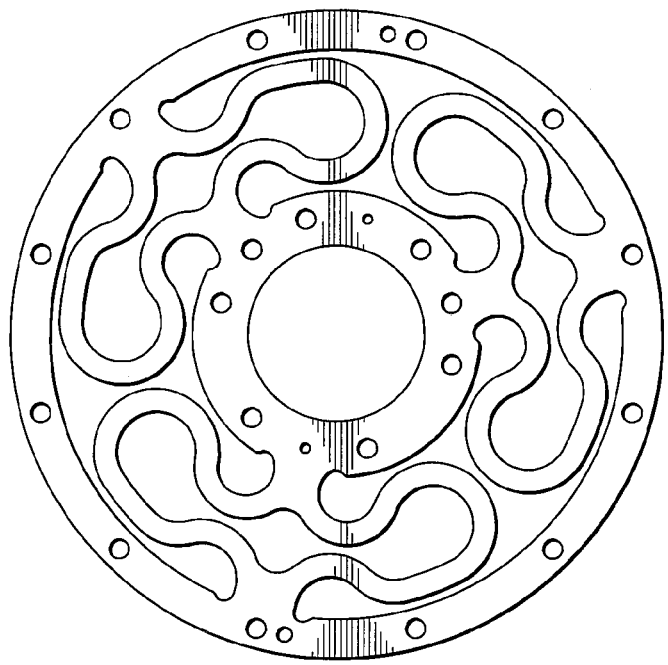
FIGS. 2A and 2B depict high-stiffness axial flexures used in the compressor of a cryocooler scaled for operation at the CMG operating frequency in accordance with embodiments of the present disclosure.
Figure 2B:
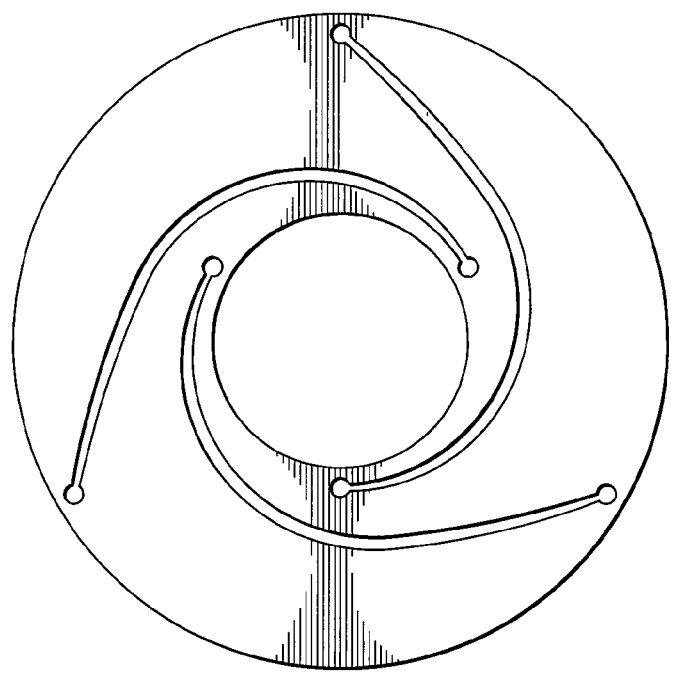

FIGS. 2A and 2B depict high-stiffness axial flexures used in the compressor of a cryocooler scaled for operation at 100 Hz in accordance with embodiments of the present disclosure. With the smaller compressor piston working volume, flexures must be thicker and/or stiffer, and possibly change in geometry, over those used in 30 to 70 Hz cryocoolers. Increased axial stiffness (up to 7.5 times that of existing flexure designs) may be achieved through material thickness changes, geometry changes, or a combination of both. Suitable changes based on the decreased working volume and the higher operating frequency are within the skill of those in the art, and must in any event be tailored to the specific piston design employed within the compressor 101.

As noted above, spaced stacks of the flexures 114 at least partially support or otherwise communicate a spring force to the pistons within the piston assemblies 111. Flexure stack spacing is determined at least in part by the piston cantilevered mass and the need to support such mass. Since the reduced piston stroke results in reduced piston length, combined with the increased radial stiffness of the thicker flexures 114, stack separation may be reduced, achieving additional size reduction.

Figure 3:
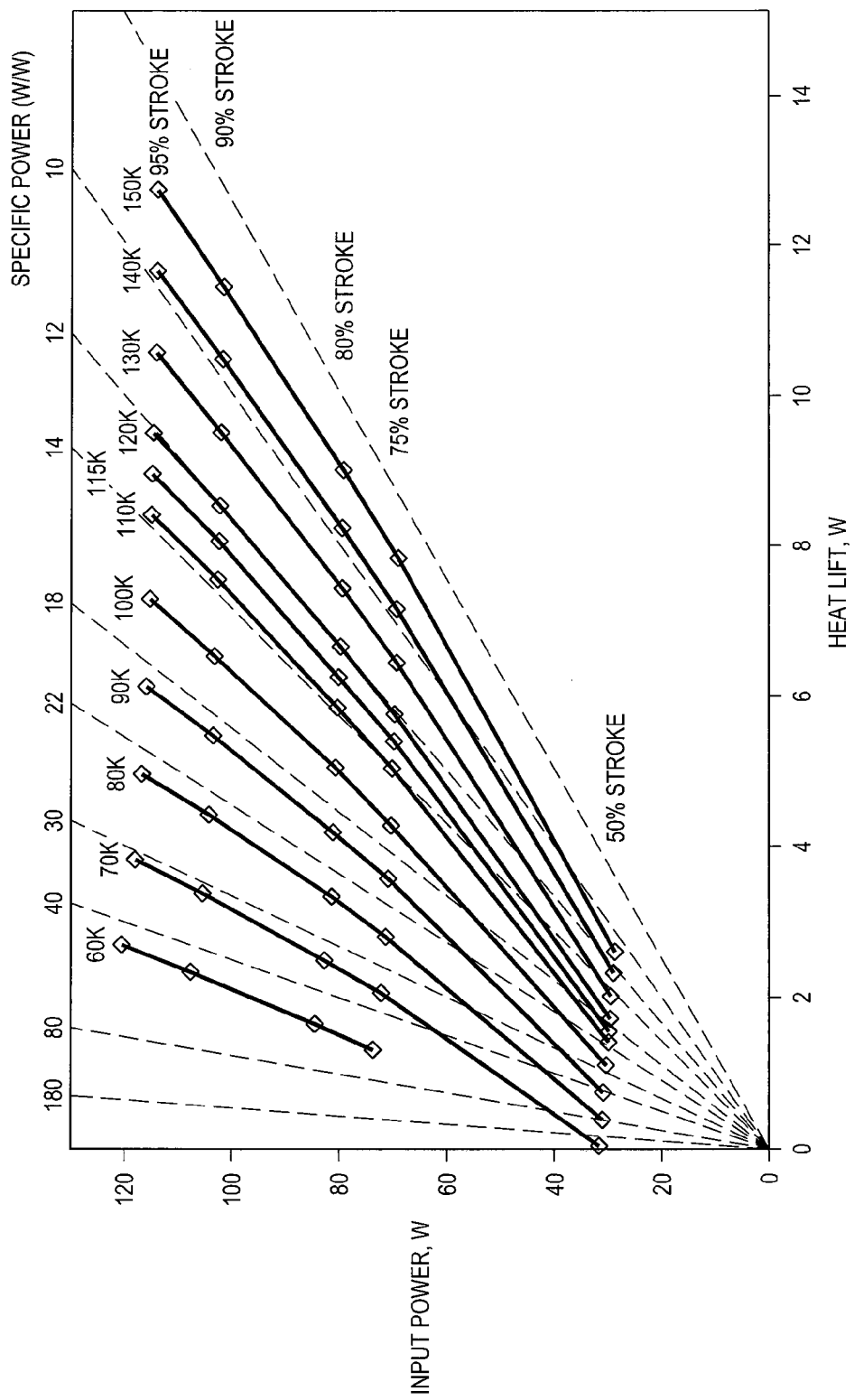
FIG. 3 is a plot of thermodynamic performance for a cryocooler scaled for operation at the CMG operating frequency in accordance with embodiments of the present disclosure.

FIG. 3 is a plot of thermodynamic performance for a cryocooler scaled for operation at 100 Hz in accordance with embodiments of the present disclosure. Heat lift (solid lines) in watts (W) and specific power (dashed lines) in W/W versus input power in W are plotted. Predicted efficiency is slightly better than a current, full scale (60 Hz) cryocooler, based on improvements due to the compressor motor redesign and optimization of the geometry to take full advantage of the advanced regenerator. Maximum input power is less (~120 W versus ~160 W).

The size and weight for the effectively miniaturized 100 Hz cryocooler 100 scale down as operating frequency increases for given input power and cooling load, reducing packaging. A size reduction of about 20%, from about 8.2 inches in length to about 6.5 inches, is possible, and a similar weight reduction of about 20% (from approximately 7.4 pounds to approximately 5.9 pounds) is also achieved, all with a simplified assembly procedure.

Exported disturbance is mitigated and becomes easier to manage, such that integration of the cryocooler with the remainder of the space platform may be simplified in at least some respects. At the higher (fundamental) operating frequency, fewer harmonics are present in the high excitation range of 0-500 Hz. Thus integration is simplified as complex isolation systems should not be necessary to protect against exported disturbance equal to or exceeding 100 milliNewtons (mN).

The system of the present disclosure exploits a simple, single stage pulse tube design and a concentric cold tip (or "cold head") for structural robustness and ease of integration, resulting in low system complexity, cost and build time. An operating frequency of 100 Hz is employed and specifically selected to match the frequency of exported disturbance from CMGs on the same platform, and to take advantage of structures designed not to resonate at 100 Hz, reducing the need for complicated isolation systems. The higher frequency operation also improves disturbance roll-off with vibration isolators. Combined with an advanced regenerator, the cryocooler achieves improved efficiency at mid-to-low cooling capacity, with reduced overall size and weight.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. §112, ¶6 (now 35 U.S.C. §112(f)) unless the words "means for" or "step for" are explicitly used in the particular claim.

What is claimed is:

1. A cryocooler, comprising:
   a compressor configured to operate at a selected frequency matching an operating frequency of one or more control moment gyroscopes for a system in which the cryocooler is configured to operate, the compressor including one or more piston assemblies coupled to flexures configured to communicate a spring force to one or more pistons within the one or more piston assemblies; and
   a cooling device in fluid communication with the compressor and including a cold tip in fluid communication with a surge volume via an inertance channel and a regenerator assembly, the cold tip configured to provide cooling to a structure external to the cryocooler.

2. The cryocooler according to claim 1, wherein a working volume of the one or more pistons within the one or more piston assemblies is sized for operation of the compressor at the selected frequency.

3. The cryocooler according to claim 1, wherein the flexures have an axial stiffness selected for operation of the one or more pistons within the one or more piston assemblies at the selected frequency.

4. The cryocooler according to claim 3, wherein one or more of a thickness and a geometry of the flexures is selected for operation of the one or more pistons within the one or more piston assemblies at the selected frequency.

5. The cryocooler according to claim 1, further comprising:
   a linear voice coil actuator configured to drive the piston within each of the one or more piston assemblies.

6. The cryocooler according to claim 5, wherein the compressor is configured to determine a position of the linear voice coil actuator based upon back-electromotive force voltage changes.

7. The cryocooler according to claim 1, wherein the regenerator assembly is an advanced regenerator.

8. The cryocooler according to claim 1, wherein the selected frequency is one of 100 Hertz (Hz), 110 Hz and 120 Hz.

9. A spacecraft comprising:
   at least one control moment gyroscope configured to operate at a frequency; and
   a cryocooler comprising:
      a compressor configured to operate at a selected frequency matching the operating frequency of the at least one control moment gyroscope, the compressor including one or more piston assemblies coupled to flexures configured to communicate a spring force to one or more pistons within the one or more piston assemblies; and
      a cooling device in fluid communication with the compressor and including a cold tip in fluid communication with a surge volume via an inertance channel and a regenerator assembly, the cold tip configured to provide cooling to a structure external to the cryocooler.

10. The spacecraft according to claim 9, further comprising:
    an infrared sensor having an orientation controlled by the at least one control moment gyroscope, wherein the infrared sensor forms a focal plane array.

11. A method of operating a cryocooler, comprising:
    operating a compressor including one or more piston assemblies coupled to flexures communicating a spring force to one or more pistons within the one or more piston assemblies at a selected frequency matching an operating frequency of one or more control moment gyroscopes for a system in which the cryocooler is configured to operate; and
    receiving fluid from the compressor in a cooling device including a cold tip in fluid communication with a surge volume via an inertance channel and a regenerator assembly, the cold tip configured to provide cooling to a structure external to the cryocooler.

12. The method according to claim 11, wherein a working volume of the one or more pistons within the one or more piston assemblies is sized for operation of the compressor at the selected frequency.

13. The method according to claim 11, wherein the flexures have an axial stiffness selected for operation of the one or more pistons within the one or more piston assemblies at the selected frequency.

14. The method according to claim 13, wherein one or more of a thickness and a geometry of the flexures is selected for operation of the one or more pistons within the one or more piston assemblies at the selected frequency.

15. The method according to claim 11, further comprising:
    driving the piston within each of the one or more piston assemblies with a linear voice coil actuator.

16. The method according to claim 15, further comprising:
    determining a position of the linear voice coil actuator based upon back-electromotive force voltage changes.

17. The method according to claim 11, wherein the regenerator assembly is an advanced regenerator.

18. The method according to claim 11, wherein the selected frequency is one of 100 Hertz (Hz), 110 Hz and 120 Hz.

19. The method according to claim 11, further comprising:
  operating the one or more control moment gyroscopes of a spacecraft including the cryocooler at the selected frequency.

20. The method according to claim 19, further comprising:
  controlling an orientation of an infrared sensor using the one or more control moment gyroscopes, wherein the infrared sensor forms a focal plane array.

* * * * *